United States Patent [19]

Silvey

[11] 4,287,793
[45] Sep. 8, 1981

[54] UNIVERSAL SAW CHAIN GRINDING MACHINE

[76] Inventor: E. Ray Silvey, 1231 Dutton Rd., Eagle Point, Oreg. 97524

[21] Appl. No.: 643,473

[22] Filed: Dec. 22, 1975

Related U.S. Application Data

[63] Continuation of Ser. No. 535,661, Dec. 23, 1974, abandoned.

[51] Int. Cl.³ .............................................. B23D 63/16
[52] U.S. Cl. ...................................... 76/25 A; 76/42
[58] Field of Search ...................... 76/25 A, 37, 40, 42; 51/98.5, 96

[56] References Cited

U.S. PATENT DOCUMENTS

| | | | |
|---|---|---|---|
| 2,589,165 | 3/1952 | Toy ...................................... | 76/25 A |
| 3,071,026 | 1/1963 | DeWitt .............................. | 76/25 A |
| 3,592,085 | 7/1971 | Arneson ............................. | 76/25 A |
| 3,616,711 | 11/1971 | Daggett ............................. | 76/42 X |
| 3,717,051 | 2/1973 | Silvey ................................ | 76/25 A |
| 3,890,857 | 6/1975 | Simington .......................... | 76/25 A |
| 4,104,793 | 8/1978 | Simington .......................... | 76/25 A |

Primary Examiner—Roscoe V. Parker
Attorney, Agent, or Firm—Klarquist, Sparkman, Campbell, Leigh, Whinston & Dellett

[57] ABSTRACT

A saw chain grinding machine has a disc-shaped grinding wheel mounted for rotation in a fixed position on the base of a grinding machine. A saw chain holder is mounted at one end of a support arm extending across and beneath the wheel, with the opposite end of the support arm being mounted on the base for swinging movement about a pivot axis parallel to the axis of rotation of the grinding wheel. Swinging movement of the support arm causes a corresponding swinging movement of the saw chain holder along the periphery of the wheel. A stop fixed to the machine base limits swinging movement of the support arm in one direction to determine a grinding position for the saw chain holder along the periphery of the wheel. The support arm is adjustable lengthwise for moving the holder and thus a saw chain cutter element toward and away from the wheel in a line extending generally toward the axis of rotation of the wheel when the arm is in grinding position against its stop. In this way movement of the holder along the arm toward the wheel to grind a cutter tooth automatically compensates for wheel wear without changing appreciably the angular positioning of sharpening along the wheel periphery. Apparatus are also provided for adjusting the height and angle of the saw chain holder relative to the peripheral edge of the wheel and for adjusting the position of sharpening of a cutter link on the saw chain holder.

16 Claims, 5 Drawing Figures

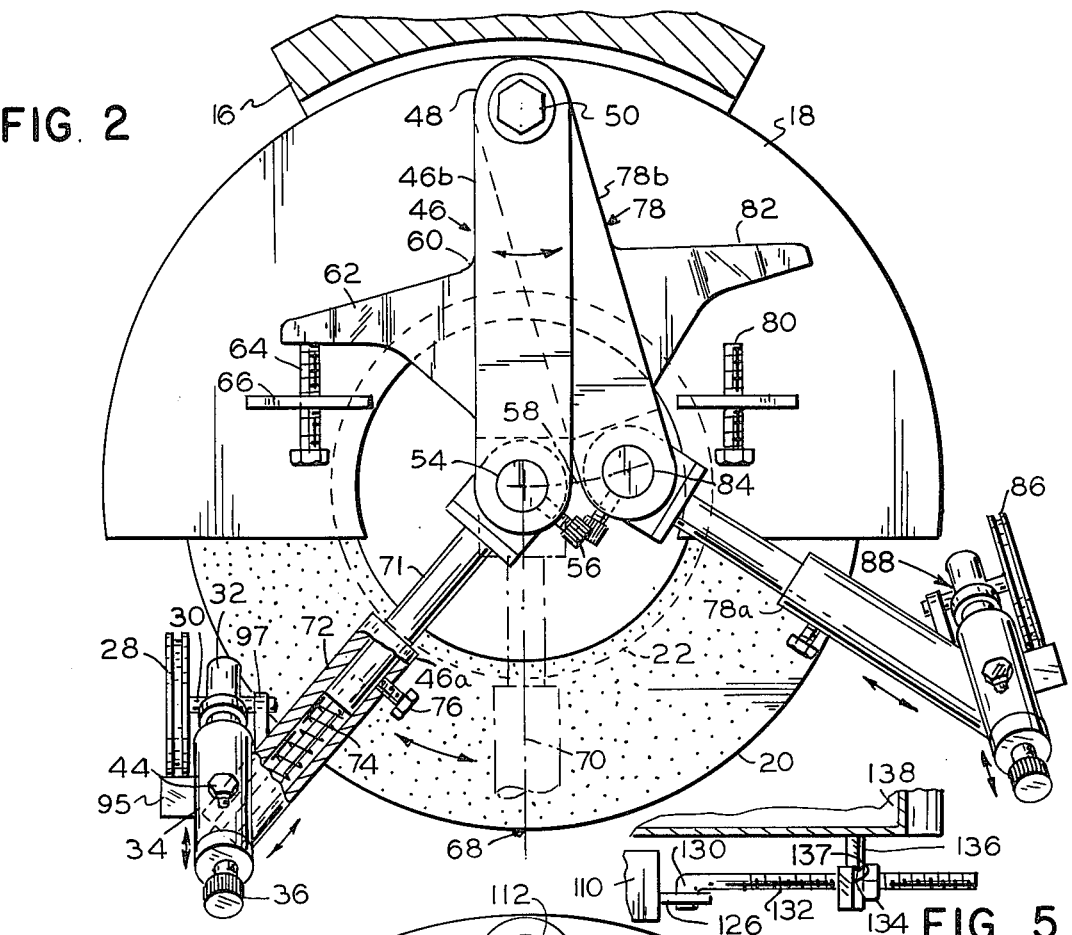
FIG. 2
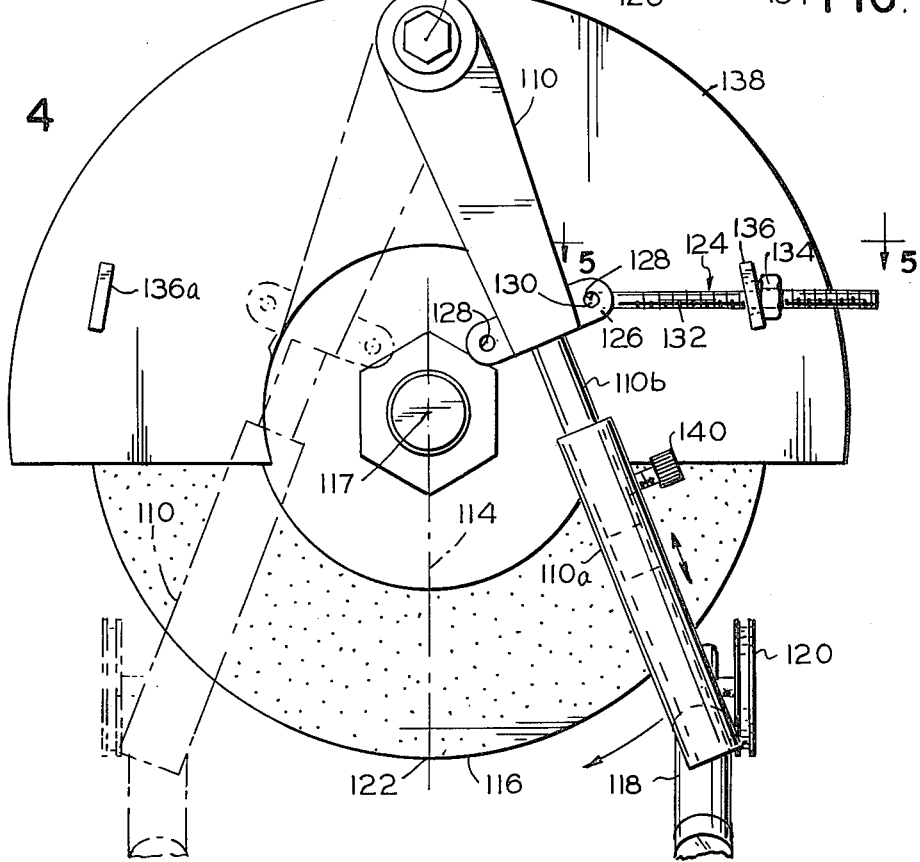
FIG. 4
FIG. 5

UNIVERSAL SAW CHAIN GRINDING MACHINE

This is a continuation, of application Ser. No. 535,661 filed Dec. 23, 1974 now abandoned.

BACKGROUND OF THE INVENTION

1. Field of the Invention

The present invention relates to a grinding machine for sharpening saw chain.

2. Description of the Prior Art

There are different types of saw chain with the different types being determined in general by the different shapes of the cutter teeth in such chain. The two most common types of saw chain have hook-shaped cutter teeth. One such common type, called the "chipper" or "round tooth" chain, has generally curved hook-shaped cutter teeth. The other common type, the so-called "chisel bit" chain, has generally L-shaped cutter teeth with the side and top portions of each tooth meeting at a sharp corner.

Grinding machines have been devised to sharpen both such types of saw chain using a disc-shaped grinding wheel. However, it has been found that for best chain performance the cutter teeth of these different types of chain should be sharpened at different angular positions along the peripheral edge of the grinding wheel. For example, with the chipper chain it is desirable to position the cutter tooth for sharpening at the center of the peripheral edge of the wheel as determined by a median plane passing through the center axis of the wheel perpendicular to the plane of the wheel. The center point of grinding is where the median plane intersects the peripheral edge of the wheel. However, with the chisel bit chain, the preferred angular position along the wheel is at about 45 degrees from the center point of grinding as measured in an arc from the axis of rotation of the wheel.

Thus far separate grinding machines have been required to grind accurately chipper and chisel-type saw chain because of the aforementioned differeing grinding positions required for these different types of chain. For example, applicant's prior U.S. Pat. No. Re. 28,057 discloses a grinding machine for sharpening chisel bit chain in which the machine is designed to position the chisel cutter teeth at the periphery of the grinding wheel at about 45 degrees to either side of the median plane of the wheel. On the other hand, applicant's prior U.S. Pat. No. 3,779,103 shows a grinding machine specifically designed for sharpening chipper chain by positioning the cutter teeth for sharpening at the center of the peripheral edge of the wheel. In some newer types of saw chain still having generally hook-shaped teeth, the optimum position for grinding is along the peripheral edge of the wheel somewhere between the aforementioned center grinding position and the 45-degree grinding position.

In known grinding machines for grinding chisel bit chain, two linear movements are used to bring the cutter tooth into grinding engagement with the wheel at the desired grinding position along the edge of the wheel. These two linear movements are at right angles to one another. One of such movements is generally perpendicular to the median plane of the wheel and the other movement is generally parallel to such median plane. The difficulty with this arrangement is that as the wheel wears to reduce its diameter, the angular position of grinding engagement of the cutter teeth along the edge of the wheel changes greatly to vary one or more of the cutting angles ground on the cutter teeth. As a result, different teeth of the same chain will have different cutting angles. A saw chain with cutters having different cutting angles performs poorly and dulls rapidly. If the wheel wear is appreciable without compensating adjustment, the wheel tends to grind a backslope in the vertical cutting edge of the cutter tooth. This is undesirable because a backslope causes the chain to feed poorly into the wood when cutting wood, thereby necessitating frequent regrinding and shortening the life of the chain.

A separate compensating adjustment of the grinding wheel is thus required to prevent the foregoing from happening, if such a compensating adjustment is available on the particular grinder. This compensating adjustment for wheel wear is commonly a movement of the center axis of the wheel toward the saw chain holder. However, in present grinders such an adjustment for wheel wear, being a separate adjustment, interrupts the grinding operation and therefore increases the time required to sharpen a saw chain. Moreover, such an adjustment is usually inconvenient to make, and requires skill and judgement to determine when needed. Therefore, the tendency is for grinder operators to wait too long before making such an adjustment or to ignore the need for adjustment entirely.

SUMMARY OF THE INVENTION

The present invention is a saw chain grinding machine capable of grinding accurately and at the correct cutting angles all cutter teeth of both chipper and chisel type saw chain without requiring any separate adjustment for wheel wear. An important feature of the grinding machine of the invention is therefore its ability to position a cutter tooth of a saw chain at any desired grinding position along the edge of a grinding wheel and to maintain such grinding position despite wheel wear during the normal course of grinding without interruption.

Another primary feature of the grinding machine of the invention is its ability to self-adjust for wheel wear. This is possible because movement of a cutter tooth into grinding engagement with the wheel takes place along a path extending generally toward the center axis of the wheel. Thus this grinding movement is the same movement that is required to compensate for wheel wear. As a result, there is a continual unconscious adjustment for wheel wear during the sharpening of each cutter tooth.

In the preferred embodiments shown, the foregoing features are obtained by mounting the saw chain holder on a support arm which extends parallel to and to one side of the grinding wheel across at least a portion thereof, with the arm being pivoted to the base of the machine for swinging movement about a pivot axis extending perpendicular to the plane of the wheel. In this way swinging movement of the arm causes a corresponding swinging movement of the holder along the edge of the wheel. The support arm itself is adjustable for length in a line extending generally toward the center of the grinding wheel. Thus as the wheel wears, it becomes necessary to shorten the arm to bring the cutter teeth into grinding engagement with the wheel. This movement at the same time automatically compensates for wheel wear since it occurs in a direction generally toward the axis of the wheel.

In one illustrated embodiment, two telescoping support arms are provided, each with its own saw chain holder and each hinged intermediate its ends at a hinge point which can be centered to coincide with the wheel axis by an adjustable arm stop. One arm is used when sharpening right-hand cutter teeth and the second arm is used in sharpening the left-hand cutter teeth of a saw chain. Shortening of an arm segment of either arm between the hinge point and the holder moves a cutter tooth on the holder into grinding engagement with the wheel at the exact grinding position desired along the edge of the wheel, regardless of the degree of wheel wear.

A second embodiment has only a simple arm and a single holder for sharpening both right- and left-hand cutter teeth of a saw chain of either the chisel- or chipper-type. The single arm is capable of swinging from the centered grinding position to either side of the median plane of the wheel.

The foregoing and other objects, features and advantages of the present invention will become more apparent from the following detailed description, which proceeds with reference to the accompanying drawings.

BRIEF DESCRIPTION OF THE DRAWINGS

In the drawings:

FIG. 2 is a view partly in section taken along the line 2—2 of FIG. 1 showing the grinding wheel and related components of the machine of FIG. 1;

FIG. 4 is a view similar to FIG. 2 but showing a second embodiment of the invention; and FIG. 5 is a view taken along the line 5—5 of FIG. 4 showing the support arm stop details of the machine of FIG. 4.

DETAILED DESCRIPTION

Figure 1:
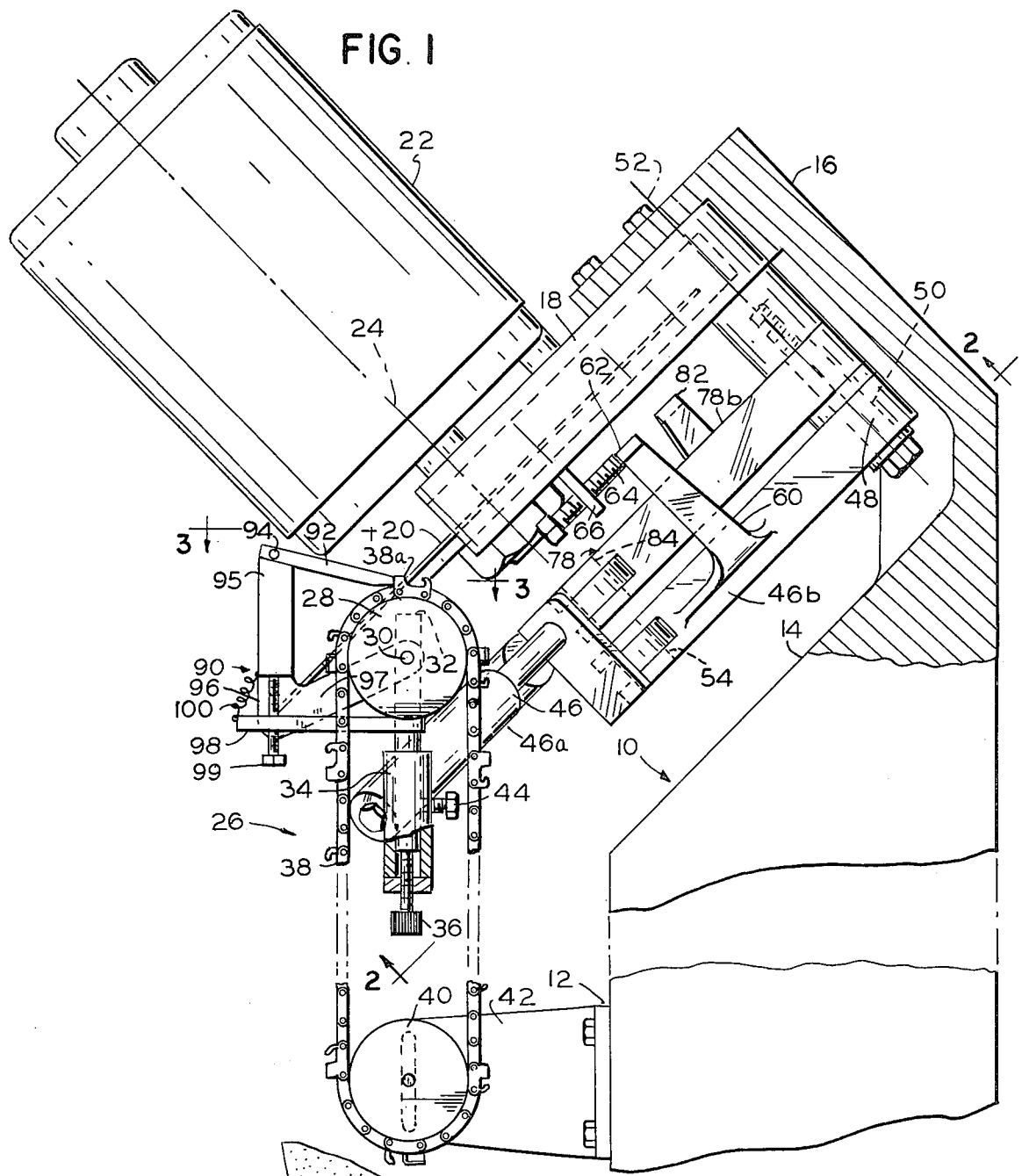
FIG. 1 is a foreshortened elevational view of a saw chain grinding machine in accordance with the present invention.

The grinding machine of FIG. 1 includes a stationary base frame 10 having an upright stand 12 for supporting the machine at floor level. The upper portion of the base extends angularly upwardly at 14 and includes a motor and grinding wheel support portion 16 extending first upwardly from angular portion 14 and then downwardly over portion 14 to form a housing portion 18. The housing 18 partially encloses a disc-shaped grinding wheel 20 and mounts an electric motor 22 for rotating the grinding wheel about its central axis of rotation 24 perpendicular to the plane of the wheel. Although the wheel is shown mounted at n angle of about 45 degrees to the horizontal, it can be mounted at any angle, or horizontally, if desired so long as the saw chain holder is mounted in a posiion to present the saw chain cutting teeth at a desired angle to the grinding wheel for sharpening. The forward portion of the grinding wheel extends forwardly of wheel housing 18 to expose the lower forward peripheral edge portion of the wheel for grinding.

A saw chain holder means indicated generally at 26 includes an upper holder wheel 28 fixed to a shaft 30 extending horizontally through a vertical post 32. The post is slidably mounted within the upright sleeve member 34 to vary the height of holder wheel 28 relative to the edge of grinding wheel 20. An adjustment screw 36 threaded through a lower end wall of sleeve 34 engages the bottom of post 32 for adjusting the height of holder wheel 28. Post 32 is also rotatable about its axis within sleeve 34, thereby providing a means for adjusting the angle of presentation of holder wheel 28 and a supported saw chain 38 relative to grinding wheel 20 and to its supporting arm to be described. A set screw 44 threaded through a sidewall of sleeve 34 can be threaded into abutment against a side of post 32 to retain the post in a desired position of angular adjustment.

As will be clear from FIG. 2, wheel 28 includes a slotted periphery for receiving saw chain 38. A lower holder wheel 40 mounted below upper wheel 28 by a bracket 42 to base frame 12 also includes a slotted periphery (not shown) for receiving a lower section of the chain. The chain is mounted on the two holder wheels and extended therebetween in the manner shown in FIG. 1. However, use of the lower wheel is not essential.

Sleeve 34 is fixed to the forward end of a support arm 46. Support arm 46 extends upwardly and rearwardly across and below grinding wheel 20 in a plane generally parallel to the plane of grinding wheel 20. The arm is mounted at its opposite end 48 by a pivot pin 50 threaded into frame portion 16 for swinging movement of the arm 46 about the pivot axis 52 of the pin. The pivot axis is perpendicular to the plane of the grinding wheel 20 and therefore, of course, parallel to the axis of rotation of such wheel. Thus by swinging arm 46 about pivot axis 52, holder wheel 28 is caused to swing in a plane parallel to the plane of the grinding wheel along the periphery of the wheel.

As shown in FIG. 2, arm 46 is hinged between its opposite ends at a hinge pin 54 for hinging adjustment of an outer arm segment 46a supporting holder 28 relative to an inner arm segment 46b pivoted to the base. The hinge connection 54 between the two arm segments can be locked by a lock screw 56 to lock the two arm segments in a desired position of angular adjustment while still permitting the entire arm 46 to be swung about pivot pin 50. The axis of hinge pin 54 is parallel to the axis of pivot pin 50 and is positioned to describe an arc 58 which intersects the axis of rotation 24 of the grinding wheel upon swinging movement of the entire arm 46.

Arm segment 46b also includes a flange 60 which extends laterally outwardly of the arm and then upwardly and then laterally again to form a wing portion 62 for abutment against an adjustable stop screw 64. Screw 64 is threaded through a retainer nut 66 fixed to the underside of grinding wheel housing 18. The stop limits swinging movement of support arm 46 and its holder wheel 28 in a direction toward the periphery of the grinding wheel 20 while permitting the arm to swing out away from the wheel along its periphery. In this manner the stop screw 64 determines the desired grinding position for the arm, holder 28 and their supported saw chain.

Stop 64 is adjusted so that holder 28 is in its correct grinding position when the axis of hinge pin 54 is coincident with the axis of rotation of the grinding wheel. With the hinge thus centered and then unlocked, outer arm segment 46a can swing holder 28 about the hinge axis to any desired position along the periphery of wheel 20 within the limits of movement permitted by wheel housing 18 and construction of the arm itself.

Holder 28 can be positioned in the foregoing manner for grinding either chipper chain or chisel bit chain, depending on the position of arm segment 46a and holder 28 relative to the zero grinding position 68 along the periphery of the grinding wheel. This zero position is at the lowermost grinding edge of wheel 20 through which a vertical median plane, indicated at 70, passes in bisecting the wheel into right- and left-hand sections. Keeping in mind that in FIG. 2 one is looking up at the bottom of the grinding wheel, the left-hand segment of the wheel is used for grinding all right-hand cutter teeth of the saw chain, whereas the right-hand section is used for grinding all left-hand cutter teeth. For grinding chisel bit chain, a 45 degree angular position of support arm 46a with respect to the zero grinding position 68 is preferred, as measured from the center axis of the grinding wheel, as shown in FIG. 2. For grinding chipper chain, the zero position 68 is preferred. However, depending on preference of the user, and the type of saw chain to be sharpened, the saw chain cutters could be ground at any angular position along the wheel periphery from the zero position to approximately 90 degrees to either side of the zero position.

An important feature of arm segment 46a is that its length can be varied as a means for moving the cutter tooth to be sharpened against the grinding wheel and thereby also compensating for wheel wear without changing appreciably the angular position of grinding along the periphery of the wheel. For this purpose arm segment 46a is of telescoping construction including the slide portion 71 telescoping within an outer tubular sleeve portion 72, the latter mounting the holder assembly. Tubular portion 72 is urged outwardly of the slide portion 70 by an internal spring 74, but the spring pressure is selected so that it can easily be overcome by the operator in pushing holder 28 inwardly toward the grinding wheel. A set screw 76 on sleeve portion 72 selectively locks the arm segment 46a in any position of length adjustment desired.

The shortening of arm 46a along its length has the effect of moving the holder and thus the saw chain supported on the holder along the arm toward the periphery and toward the center of the grinding wheel, and, as already suggested, serves two functions. First, the adjustment can be used to move the cutter tooth to be sharpened into engagement with the periphery of the grinding wheel after the arm 46 has been swung into grinding position against stop 64. Second, the same movement of the holder and thus the cutter tooth into the periphery of the grinding wheel along the axis of arm segment 46a automatically compensates for any wheel wear without changing the angular position of grinding along the wheel because the axis of arm segment 46a extends toward the center of the wheel. Since this geometric arrangement eliminates any appreciable variation in the grinding position due to wheel wear, all cutter teeth of a saw chain will be ground at the same correct cutting angles if the initial cutting position is correctly selected. The normal sequence of grinding is first to swing arm 46 toward the wheel until wing 62 abuts stop 64. If at this point the cutter tooth to be sharpened does not engage the periphery of the wheel, the second step is to move the cutter tooth into the grinding wheel by moving the holder on arm segment 46a into the wheel along the axis of such arm segment. In grinding in this manner, no additional third adjustment for wheel wear is ever required.

The single support arm 46 and its supported holder 28 would be sufficient to sharpen both left- and right-hand cutters of a saw chain. However, to do so would require a major readjustment of the support arm in setting up for grinding cutters of one hand after having ground cutters of the opposite hand. Therefore it is more convenient and faster if the grinder is provided with two support arms as shown, each with its own saw chain holder. The second arm 78 is of similar construction to arm 46 and shares a common pivot axis and pivot pin 50. However, arm 78 has its own separate stop structure including stop screw 80 and wing extension 82, a separate center hinge 84, and its own saw chain holder 86 and holder adjustment assembly 88. Also, since the two arms do share the common pivot pin 50, the inner arm section 78b of support arm 78 is in the same plane as the outer arm segment 78a of the same arm to avoid conflict with arm segment 46b. Arm segment 46b of arm 46 is in a plane below and parallel to the plane of arm segment 78b and then makes a dog leg up to the plane of arm segment 46a just beyond its hinge point 54. Arm segments 46a and 78a therefore lie in the same plane.

With the two support arms as shown, arm 46 is adjusted in the desired angular position and used on the left-hand side of the wheel as viewed in FIG. 2 for grinding the cutters of one hand, while arm 78 is suitably adjusted and used on the right-hand side of the wheel for grinding the cutters of the opposite hand on the same saw chain. In this way no time is lost in changing the adjustment of the machine when switching the saw chain from holder 28 to holder 86.

Figure 3:
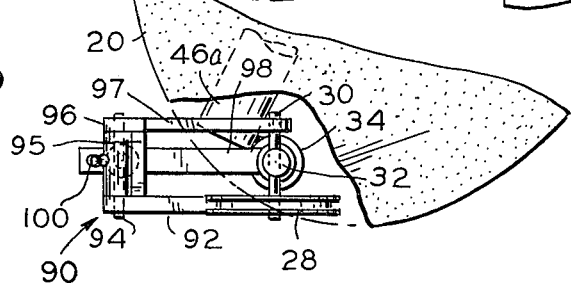
FIG. 3 is a view taken along the line 3—3 of FIG. 1 showing a saw chain stop assembly portion of the machine in plan.

Both saw chain holder 28 and saw chain holder 86 carry suitable tooth stop means indicated generally at 90 in FIGS. 1 and 3 with respect to holder 28. The stop assembly 90 includes a sharp-nosed stop member 92 which engages the rear of a cutter element to be sharpened to hold the tooth to be sharpened in correct grinding position on holder 28. The stop 92 is pivoted at its rear end on a pivot pin 94 so that as a cutter link 38a is rotated on holder 28 toward the grinding wheel (clockwise in FIG. 1), stop 92 rides over the depth gauge and cutter tooth of the link, coming to rest at the rear of the link, whereupon the link is pulled back against the stop to correctly position and hold the tooth for presentation to the edge of the grinding wheel.

Pivot shaft 94 extends through a height adjustment block 95 cantilevered from the upper end of an upright arm portion 96 of a stop support lever 97. This lever is pivoted to the same cross shaft 30 of upright holder post 32 that mounts holder wheel 28. A second arm 98 projects horizontally from holder post 32 below cross shaft 30 and mounts an adjustment screw 99. Adjustment screw 99 is threaded through arm 98 and up against the underside of block 95. Thus threaded adjustment of screw 99 upwardly changes the height and angular position of stop 92 with respect to a saw chain cutter link on holder 28 to adjust the position of the cutter link with respect to the periphery of grinding wheel 20. A spring 100 attached at one end to block 95 and at its opposite end to arm 98 urges the block against the top of adjustment screw 99.

OPERATION

FIG. 1 Form

In operation a saw chain to be sharpened is mounted on holder wheel 28 and about lower holder wheel 40 with the motor 22 off.

Assuming first that a chisel bit saw chain is to be sharpened, arm 46 is adjusted so that its inner arm segment 46b coincides with the axis of rotation of grinding wheel 20 using stop screw 64 to attain the necessary adjustment. Then hinge 54 of arm 46 is unlocked using lock screw 56, and arm segment 46a is pivoted about the hinge until its angular position is at approximately 45 degrees with respect to the center point of grinding 68 and median plane 70 of the wheel, as shown in FIG. 2. Then the hinge is relocked. At this point holder 28 is also correctly positioned angularly with respect to the wheel by releasing set screw 44 and rotating the holder about the axis of post 32, then resetting the screw.

Next, depending on the size of the chain, the height of upper holder wheel 28 is adjusted using the height adjustment screw 36. Finally, stop adjustment screw 98 is used to adjust the position of the saw chain stop 92 to correctly position a saw chain cutter link to be sharpened with respect to the edge of the grinding wheel 20. Now the right-hand cutters are ready for sharpening.

Arm 46 can be swung out away from the wheel about its pivot pin 50 if desired, and the same adjustments repeated with respect to the arm 78. Then arm 78 is swung out of the way and grinding commenced with the saw chain on holder 28. This is done by swinging arm 46 in toward the edge of grinding wheel 20 (counterclockwise in FIG. 2) until the tooth to be sharpened engages the edge of the grinding wheel. However, if this does not happen, possibly because of wheel wear, the arm swings inwardly against stop 64. When no further swinging movement of the arm is possible, set screw 76 on arm segment 46a is released and the holder is pushed inwardly along arm segment 46a until the tooth engages the edge of the wheel and the desired grinding has been accomplished. Thereafter set screw 76 can be reset if desired to lock arm segment 46a in its adjusted position as a gauge to determine the extent of grinding for the next tooth.

Arm 46 is swung out away from the grinding wheel again (clockwise in FIG. 2) and the next tooth to be sharpened is advanced on holder 28 (clockwise in FIG. 1) until it rides under stop 92 whereupon it is pulled back against the stop ready for grinding. Then the foregoing steps are repeated until all cutter teeth of the same hand have been sharpened.

Thereafter the saw chain is removed from holder 28 and placed on the holder 86 of the second support arm 78. The preceding operations are then repeated with respect to the cutter teeth of the opposite hand to complete the sharpening of the saw chain.

In sharpening a chipper chain, the same procedures are followed, except that the arms 46, 78 are adjusted so that the cutter teeth engage the edge of the grinding wheel at the center point of grinding 68. In such case, inward movement of the holders 28, 86 along their respective arms 46, 78 to move the tooth against the grinding wheel still occurs in a direction toward the center of the grinding wheel. Thus wheel wear does not affect the position of grinding along the edge of the wheel, and no separate adjustment for wheel wear is required.

Possible Modifications

Although the two-arm version of FIGS. 1 and 2 is convenient and fast and requires no separate adjustment for wheel wear without loss of grinding accuracy, other arm constructions provide the same or at least nearly the same advantages. As has already been noted, one of the arms 78 or 46 could be eliminated entirely and the machine would still be capable of grinding both right- and left-hand cutters of both chipper- and chisel-type saw chain.

Also the pivot pin 50 could be moved to any position along the median plane 70 of the wheel on either side of the axis of rotation of the wheel without affecting grinding accuracy so long as the hinge axis could be positioned in proximity to the axis of rotation of the grinding wheel.

In fact, if desired, the pivot axis 52 could be moved to coincide with the axis of rotation of the grinding wheel, thereby eliminating the need for hinge 54 in its entirety. With such an arrangement, all sharpening would take place by moving the holder inwardly along the axis of its support arm toward the edge of the grinding wheel and center of the grinding wheel, whereby only one sharpening movement would be required.

It would also be possible to separate the pivot points for the two arms 46 and 78 so that they are at different positions on the wheel housing. For example, the pivot point for arm 46 could be either to the left or right of median plane 70 and the corresponding pivot point for arm 78 could be in a corresponding position on the opposite side of the median plane. If the pivot point for arm 46 is on the same side of the median plane 70 as its supported holder 28 and the pivot point for arm 78 on the same side of the median plane 70 as holder 86, then the dog leg construction of arm 46 could be eliminated since there would be no conflict between the two arms.

Even if the support arm for the saw chain holder does not have a hinge axis which can be positioned to coincide with the axis of rotation of the grinding wheel or a pivot pin which can be so positioned, nevertheless reasonably accurate grinding will result if the portion of the support arm that can be adjusted for length extends generally toward the center of the wheel from the holder. This principle is illustrated in the modification shown in FIG. 4. In this modification of the grinding machine, there is only a single support arm 110 without any hinge. The arm extends in a straight line from its pivot pin 112 at a point along the median plane 114 of a grinding wheel 116 offset from the center axis of rotation 117 of the wheel. The single arm extends in a straight line across the wheel on one side thereof to a holder support assembly 118 at its free end supporting a saw chain holder 120. The support assembly and holder are similar in construction to those previously described with respect to the machine of FIGS. 1 and 2.

Although there is only a single arm 110, it will be apparent that it can be swung to both sides of median plane 114 to grind both right- and left-hand cutter teeth of a saw chain. The full-line and phantom-line positions of arm 110 in FIG. 4 are typical positions used to grind chisel bit chain.

It will also be apparent that arm 110 can be positioned along median plane 114 so that a saw chain can be positioned at the center point of grinding 122 along the lower periphery of the wheel for grinding chipper chain.

Arm 110 is provided with a stop structure 124 which can be adjusted to limit inward swinging travel of the arm toward the periphery of the wheel to determine the grinding position of holder 120. The stop structure permits outward swinging movement of the arm away from the wheel so that the next cutter link to be sharpened can be advanced on the holder for grinding.

The stop structure includes a stop bracket 126 on the arm with a pair of bracket flanges extending to opposite sides of the arm. Each flange has a hole 128 therethrough into which a hook portion 130 of an adjustment screw 132 can be inserted. Adjustment screw 132 carries a stop nut 134. The position of the nut along the length of the screw determines the position of adjustment of arm 110 by abutment with a fixed stop member 136 affixed to the underside of grinding wheel housing 138. As shown in FIG. 5, stop member 136 has a hook-shaped opening 137 which enables insertion of screw member 124 and which retains the screw member while permitting it to slide therein until stop nut 134 engages stop member 136.

A similar stop member 136a is provided in a corresponding position on the opposite underside of grinding wheel housing 138. Thus in swinging arm 110 from one side of the grinding wheel to the other for grinding teeth of the opposite hand, adjustment screw 132 is simply unhooked from one flange of bracket 126, removed from stop member 136 on one side of the housing and hooked to the opposite flange of the same bracket and inserted into the opposite fixed stop member 136a.

In operation, a saw chain on holder 120 in proper position for grinding is ground by swinging arm 110 first inwardly toward the periphery of the grinding wheel until stop nut 134 engages fixed stop member 136. Then if grinding engagement of the cutter tooth with the wheel does not occur, the outer movable portion 110a of arm 110 is moved axially inwardly along the fixed arm portion 110b until the cutter tooth engages the periphery of the wheel and is sharpened to the desired extent. Thereafter arm 110 is locked in its adjusted position using an adjustment screw 140 on the arm. The arm is then swung out away from the wheel so that the next tooth can be advanced on holder 120 to sharpening position.

With the modification of FIG. 4, it will be apparent that inwward movement of holder 120 along the axis of the arm 110 does not move the saw chain exactly toward the center of the wheel because of the position of pivot axis 112. Nevertheless, since the axis of the arm does move generally toward the center of the wheel and toward the median plane 114 rather than parallel or at right angles to such median plane, wear of the grinding wheel does not cause any appreciable shift in the angular position of sharpening of the cutter teeth along the periphery of the wheel with respect to the center position 122.

In a single-arm version of the grinding machine intended for sharpening both chisel and chipper chain, it is preferred that the axis of pivot pin 112 be positioned along the median plane 114 of the wheel so that the arm can be adjusted with equal facility on both sides of the median plane of the wheel.

Having illustrated and described what are presently preferred embodiments of the invention, it will be apparent to those skilled in the art that the same permit of modification in arrangement and detail. I claim as my invention all such modifications as come within the true spirit and scope of the following claims.

I claim:

1. A saw chain grinding machine comprising:
a machine base,
a disc-shaped rotatable grinding wheel,
said base including means mounting said grinding wheel for rotation about a central axis perpendicular to the plane of said wheel and lying in a median plane dividing said wheel into right-hand and left-hand grinding segments,
saw chain holder means for supporting a saw chain with the cutter elements in position for grinding,
a support arm for supporting said holder means,
said support arm extending lengthwise in its operative position across at least a portion of said wheel on one side thereof
means mounting said support arm at a position spaced along said arm from said holder means on said base for swinging movement about a pivot axis parallel to said axis of rotation, said pivot axis being positioned with respect to said axis of rotation such that when said arm is in an operative position with said holder means in a grinding position offset from said median plane along a peripheral edge of said wheel said arm extends from said holder means in a direction generally toward said median plane,
said pivot axis being positioned in said median plane, said median plane passing through a peripheral edge of said wheel to define a center point of grinding at said peripheral edge, said arm being swingable about said pivot axis to position a saw chain cutter element to be sharpened at said center point and at variable angular grinding positions along said peripheral edge from said center point.

2. A machine according to claim 1 wherein said variable angular grinding positions vary from zero degrees to greater than 40 degrees as measured in an arc from said axis of rotation.

3. A machine according to claim 1 wherein said support arm is swingable to opposite sides of said median plane to position cutter elements on said holder means at variable angular grinding positions, at said center point, and on both sides of said center point along said edge of said grinding wheel.

4. A machine according to claim 1 including a pair of said support arms, each mounting a separate one of said holder means, one of said arms being swingable about its said pivot axis from a position wherein said holder means lies in said median plane to positions wherein said holder means lies to one side of said median plane, said other support arm being swingable about its said pivot axis to variable positions on the other side of said median plane from said first-mentioned support arm.

5. A saw chain grinding machine comprising:
a machine base,
a disc-shaped rotatable grinding wheel,
said base including means mounting said grinding wheel for rotation about a central axis perpendicular to the plane of said wheel and lying in a median plane dividing said wheel into right-hand and left-hand grinding segments,
saw chain holder means for supporting a saw chain with the cutter elements in position for grinding,
a support arm for supporting said holder means,
said support arm extending lengthwise in its operative position across at least a portion of said wheel on one side thereof
means mounting said support arm at a position spaced along said arm from said holder means on said base for swinging movement about a pivot axis parallel to said axis of rotation, said pivot axis being positioned with respect to said axis of rotation such that when said arm is in an operative position with said holder means in a grinding position offset from said median plane along a peripheral edge of said wheel said arm extends from said holder means in a direction generally toward said median plane,
said support arm including two arm segments hinged together at a hinge point between said pivot axis and said holder means for hinging movement about a hinge axis parallel to said pivot axis, said hinge axis being movable along an arc passing through said axis of rotation of said wheel upon swinging movement of said arm about said pivot axis, and means for adjusting the angular relationship between said arm segments in a plane parallel to the plane of said wheel and for maintaining said angular relationship.

6. A machine according to claim 5 including stop means for engaging one of said arm segments to limit swinging movement of said support arm and to position said arm with said hinge axis coincident with said axis of rotation while permitting swinging movement of said support arm about said pivot axis in a direction to swing said holder means away from the periphery of said wheel.

7. A machine according to claim 6 including a pair of said hinged support arms, each supporting a separate said holder means.

8. A machine according to claim 7 wherein said pair of hinged support arms are swingable about a common said pivot axis.

9. A saw chain grinding machine comprising:
a stationary base frame,
a disc-shaped grinding wheel mounted on said base frame for rotation about a central axis perpendicular to the plane of said wheel,
saw chain holder means for supporting a saw chain with a cutter element in position for grinding,
support means for supporting said holder means at a peripheral edge portion of said wheel,
means mounting said support means and grinding wheel for relative swinging movement with respect to one another in an arcuate path about a pivot axis perpendicular to the plane of said wheel and spaced from said holder means for positioning of said holder means at various positions along said peripheral edge portion of said wheel,
adjustable stop means on said frame for limiting said relative swinging movement of said support means and wheel to determine a grinding position of said holder means along said peripheral portion of said wheel,
and means mounting said holder means and grinding wheel for relative linear movement toward one another along a straight path extending generally toward said axis of rotation to position a cutter element of a saw chain on said holder means in grinding engagement with said wheel when said holder means is in said grinding position and simultaneously compensate for wear of said grinding wheel.

10. A saw chain grinding machine comprising:
a stationary base frame,
a disc-shaped grinding wheel mounted on said base frame for rotation about a central axis perpendicular to the plane of said wheel,
saw chain holder means for supporting a saw chain with a cutter element in position for grinding,
support means for supporting said holder means at a peripheral edge portion of said wheel,
means mounting said support means and grinding wheel for relative swinging movement with respect to one another in an arcuate path about a pivot axis perpendicular to the plane of said wheel and spaced from said holder means for positioning of said holder means at various positions along said peripheral edge portion of said wheel,
adjustable stop means on said frame for limiting said relative swinging movement of said support means and wheel to determine a grinding position of said holder means along said peripheral portion of said wheel,
and means mounting said holder means and grinding wheel for relative linear movement toward one another along a straight path extending generally toward said axis of rotation to position a cutter element of a saw chain on said holder means in grinding engagement with said wheel when said holder means is in said grinding position and simultaneously compensate for wear of said grinding wheel,
said support means comprising a support arm swingable about said pivot axis for swinging said holder means along said peripheral edge of said wheel, said means mounting said holder means and grinding wheel for relative linear movement comprising means on said support arm supporting said holder means and movable along said arm toward said axis of rotation.

11. A machine according to claim 10 wherein said pivot axis of said support arm lies in a median plane perpendicular to the plane of said wheel and passing through said axis of rotation and through a peripheral edge portion of said wheel determining the center grinding position of said peripheral edge portion, said holder means being swingable with said support arm about said pivot axis from said center grinding point to at least one side of said median plane through an arc of at least 45 degrees as measured from said axis of rotation.

12. A machine according to claim 11 wherein said arm is swingable about said pivot axis in a direction toward and away from said median plane, said holder means being swingable about said pivot axis from a position spaced from said median plane to a position lying in said median plane, said arm being adjustable lengthwise in a line extending from said holder means toward said median plane.

13. A saw chain grinding machine comprising:
a machine base,
a disc-shaped rotatable grinding wheel,
said base including means mounting said grinding wheel for rotation about a central axis perpendicular to the plane of said wheel and lying in a median plane dividing said wheel into right-hand and left-hand grinding segments,
saw chain holder means for supporting a saw chain with the cutter elements in position for grinding,
a support arm for supporting said holder means,
said support arm extending lengthwise in its operative position across at least a portion of said wheel on one side thereof
means mounting said support arm at a position spaced along said arm from said holder means on said base for swinging movement about a pivot axis parallel to said axis of rotation, said pivot axis being positioned with respect to said axis of rotation such that when said arm is in an operative position with said holder means in a grinding position offset from said median plane along a peripheral edge of said wheel said arm extends from said holder means in a direction generally toward said median plane,
means for moving said holder means while in its grinding position in a linear path closer to said axis of rotation in a plane parallel to the plane of said grinding wheel to move a cutter element of a saw chain supported by said holder means into grinding engagement with said grinding wheel and simultaneously compensate for wear of said wheel.

14. A machine according to claim 13 wherein said means for moving said holder means comprises means for varying the length of said support arm.

15. A saw chain grinding machine comprising:
a machine base,
a disc-shaped rotatable grinding wheel,
said base including means mounting said grinding wheel for rotation about a central axis perpendicular to the plane of said wheel and lying in a median plane dividing said wheel into right-hand and left-hand grinding segments,
saw chain holder means for supporting a saw chain with the cutter elements in position for grinding,
a support arm for supporting said holder means,
said support arm extending lengthwise in its operative position across at least a portion of said wheel on one side thereof
means mounting said support arm at a position spaced along said arm from said holder means on said base for swinging movement about a pivot axis parallel to said axis of rotation, said pivot axis being positioned with respect to said axis of rotation such that when said arm is in an operative position with said holder means in a grinding position offset from said median plane along a peripheral edge of said wheel said arm extends from said holder means in a direction generally toward said median plane,
means for moving said holder means along said support arm in a plane parallel to the plane of said grinding wheel to move a cutter element of a saw chain on said holder means into grinding engagement with said wheel and simultaneously compensate for wear of said wheel.

16. A saw chain sharpener, said sharpener including:
a rotary grinding member,
a support arm,
means oscillatably mounting one end portion of said support arm for angular displacement about an axis generally paralleling the axis of rotation of said grinding member,
said support arm, at a location spaced therealong from said one end portion thereof, including support means for supporting a saw chain for guided shifting of at least a short lengthwise extending section thereof longitudinally of said support arm,
the spacing of said support means along said support arm from the axis of oscillation of the latter being such so as to position said support means generally on radii of the axis of rotation of said rotary grinding member when said support arm is swung into positions closely adjacent opposite side portions of the periphery of said grinding member,
and means for moving said support means while in its grinding position in a linear path closer to said axis of rotation in a plane parallel to the plane of said grinding member to move a cutter element of a saw chain supported by said support means into grinding engagement with said grinding member and simultaneously compensate for wear of said grinding member.

* * * * *

UNITED STATES PATENT AND TRADEMARK OFFICE
CERTIFICATE OF CORRECTION

PATENT NO. : 4,287,793

DATED : September 8, 1981

INVENTOR(S) : E. Ray Silvey

It is certified that error appears in the above—identified patent and that said Letters Patent is hereby corrected as shown below:

On the title page, [57] ABSTRACT, line 23, "Apparatus" should read --- Means ---.

Column 7, line 34, after "then" should follow --- is ---.

Column 10, line 25, "40" should read --- 45 ---.

Signed and Sealed this

Twelfth Day of January 1982

[SEAL]

Attest:

Attesting Officer

GERALD J. MOSSINGHOFF

Commissioner of Patents and Trademarks